Patented Feb. 20, 1951

2,542,225

UNITED STATES PATENT OFFICE 2,542,225

STABILIZED BENZYL CHLORIDE

James L. West, Jr., St. Louis, Mo., assignor to Monsanto Chemical Company, St. Louis, Mo., a corporation of Delaware No Drawing. Application October 4, 1948, Serial No. 52,791

6 Claims. (Cl. 260—651)

This invention relates to the stabilization of benzyl chloride, and more particularly, to novel compositions comprising benzyl chloride and a stabilizer therefor.

Benzyl chloride is a widely used intermediate in the production of benzyl derivatives, such as benzyl alcohol, benzyl benzoate, benzyl cellulose, benzyl acetate and the alkyl benzyl phthalates, and such benzyl derivatives find wide application as pharmaceuticals, plasticizers, rubber chemicals, gasoline gum inhibitors, dyestuffs and perfume bases.

A serious disadvantage in the use of benzyl chloride lies in the fact that benzyl chloride is extremely unstable, oftentimes violently unstable, in the presence of iron, iron oxides or iron salts. Those who are familiar with the handling and use of benzyl chloride recognize that infinite and painstaking care must be exercised in the handling of benzyl chloride, as the slightest contamination, such as a fleck of rust in a drum of benzyl chloride, will result in decomposition and darkening of the benzyl chloride with an accompanying evolution of hydrogen chloride. The entire drum of benzyl chloride is then unfit for manufacturing uses and furthermore, the contaminated benzyl chloride is generally not recoverable. Manufacturers of benzyl chloride, particularly anyhdrous benzyl chloride take great care to insure that benzyl chloride is packaged in clean nickel drums or nickel-lined containers. However, in spite of all precautions, should a speck of rust get into a container of benzyl chloride and the container be then sealed, the speck of rust will incite the decomposition of the benzyl chloride and the hydrogen chloride evolved due to the decomposition will generate sufficient pressure to cause rupture of the container, particularly drums. This presents an undesirable aspect for the reason that, not only is the benzyl chloride rendered unfit and lost for manufacturing purposes, but the spilled liquid benzyl chloride is irritating to the skin and the benzyl chloride vapors are highly irritating to the eyes.

A large amount of effort has been expended to try to stabilize benzyl chloride to prevent decomposition of the benzyl chloride in the event that the material is accidently contaminated with iron, rust or iron salts. Benzyl chloride is presently stabilized with a 10% aqueous sodium carbonate solution. Benzyl chloride thus stabilized may be safely shipped in black iron drums without danger of decomposition in the event of accidental contamination with iron, rust or iron salts. For example, 450 pounds of benzyl chloride mixed with 23 pounds of a 10% aqueous sodium carbonate solution may be safely shipped in a 55 gallon black iron drum. This wet stabilized material is a milky-white emulsion, from which a water layer may separate upon standing. However, before use, the benzyl chloride must be recovered from the stabilized solution, as anhydrous liquid benzyl chloride is preferred and necessary for most operations. Therefore, at the present time, a user of benzyl chloride must either recover benzyl chloride from the sodium carbonate stabilized aqueous solution, or accept the risk of decomposition due to contamination of the anhydrous liquid benzyl chloride shipped in nickel drums.

It is an object of this invention, therefore, to provide benzyl chloride stabilized against decomposition due to contamination by iron, rust or iron salts. A further object of this invention is to provide anhydrous benzyl chloride stabilized against decomposition due to accidental contamination by iron, rust or iron salts. A still further object is to provide novel compositions comprising benzyl chloride and a stabilizer to prevent decomposition due to accidental decomposition by iron, rust or iron salts.

I have discovered that benzyl chloride containing 0.05% to 2% by weight of N,N' dialkyl thiourea, wherein the alkyl substituent contains at least 1 and not more than 8 carbon atoms, is effectively stabilized against decomposition due to contamination by iron, rust or iron salts. Hereinafter the expression "N,N' dialkyl thiourea" is meant to include only those N,N' dialkyl thioureas wherein the alkyl substituent contains at least 1 and not more than 8 carbon atoms.

In the practice of this invention, a preferred stabilized benzyl chloride composition consists of benzyl chloride and 0.5% by weight of N,N' dialkyl thiourea and a preferred range of composition consists of benzyl chloride and 0.1% to 1.0% by weight of N,N' dialkyl thiourea. Such compositions are effectively stabilized against decomposition due to contamination by iron, rust or iron salts not only under the temperature conditions encountered in the ordinary handling, storage and transportation of benzyl chloride, but also under elevated temperatures. Moreover, benzyl chloride thus stabilized with 0.1% to 1.0% by weight of N,N' dialkyl thiourea is not changed in appearance, the physical and chemical properties of the benzyl chloride are not appreciably effected and benzyl chloride thus stabilized may be used in manufacturing processes in the same manner as unstabilized benzyl chloride without the necessity of removing the stabilizing agent prior to the use of the benzyl chloride.

The following examples are illustrative of the outstanding stabilizing action of N,N' dialkyl thiourea and also of the method by which this invention may be practiced, however, it is not intended that this invention be limited solely to the methods and compositions set forth in the examples:

EXAMPLE I

To test the stabilizing action of N,N' dialkyl thiourea, approximately 100 grams of anhydrous benzyl chloride, obtained from a commercial manufacturing process, were heated to 60° to 65° C. in a glass flask equipped with an air condenser and varying quantities of various N,N' dialkyl thioureas were added. After it was ascertained that no immediate change occurred, a piece of rusty iron was added to the sample. The total surface area of the wire exposed to benzyl chloride was so regulated that it was in the same ratio to the volume of product (0.017 sq. in. per gram of benzyl chloride) as in the case of storage in black iron 55-gallon drum. The sample was stored in an oven maintained at 60°–65° C. until decomposition was noted as evidenced by the violent evolution of HCl and polymerization of benzyl chloride which caused the mixture to become a dark blackish brown color.

Table A contains the results of the stabilizing effect of various N,N' dialkyl thioureas on benzyl chloride.

*Table A*

| Benzyl Chloride Containing (by weight) | Time Interval Before First Evidence of Decomposition at 60° to 65° C. |
|---|---|
| No stabilizer | 3 minutes. |
| 0.5% N,N' diethyl thiourea | 10 days, 13 hours, 55 minutes. |
| 0.5% N,N' diisopropyl thiourea | 10 days, 18 hours, 53 minutes. |
| 0.1% N,N' dibutyl thiourea | 17 hours, 42 minutes. |
| 0.3% N,N' dibutyl thiourea | 3 days, 8 hours, 0 minutes. |
| 0.4% N,N' dibutyl thiourea | 8 days, 9 hours, 0 minutes. |
| 0.5% N,N' dibutyl thiourea | 23 days, 2 hours, 55 minutes. |
| 0.7% N,N' dibutyl thiourea | 29 days, 22 hours, 0 minutes. |
| 1.0% N,N' dibutyl thiourea | 30 days, 16 hours, 0 minutes. |

The results shown in Table A clearly indicate the outstanding stabilizing effect of the several N,N' dialkyl thioureas. Other similar compounds which stabilize benzyl chloride in the presence of iron, rust or iron salts are the N,N' dimethyl thiourea, N,N' dipropyl thiourea, N,N' diamyl thiourea, N,N' di-(2-methylpentyl) thiourea, N,N' dihexyl thiourea, N,N' diheptyl thiourea, N,N' dioctyl thiourea, N,N' diisooctyl thiourea, N,N' dicapryl thiourea, and N,N'-di-(2-ethylhexyl) thiourea. It is not intended that this listing be exhaustive of the N,N' dialkyl thiourea which stabilize benzyl chloride but merely illustrative of the more common N,N' dialkyl thioureas, wherein the alkyl substituent contains at least one and not more than eight carbon atoms, which exhibit this stabilizing effect.

EXAMPLE II

Two 55-gallon nickel drums containing anhydrous benzyl chloride were obtained from a commercial manufacturing process. These drums were carefully opened and a composite sample of the two drums obtained. 0.5% by weight of N,N' dibutyl thiourea was added to drum No. 1 and 2.0% by weight of N,N' dibutyl thiourea was added to drum No. 2. About a cup full of rusty iron scrapings were added to each of the drums 1 and 2. The drums were then sealed by connecting them to a pressure monometer to indicate any pressure changes within the drums. As was pointed out hereinbefore, decomposition of benzyl chloride due to rust (iron) contamination is evidenced by an abnormal evolution of hydrogen chloride gas. The pressure generated within a contaminated drum is often large enough to rupture the ends of the drum. However, after 130 days of storage under generally encountered temperature conditions of 20° to 35° C., the above drums 1 and 2 evidenced no abnormal gas generation. The composite sample obtained from drums 1 and 2, prior to stabilization, was tested in the laboratory by adding a few specks of the rusty iron scrapings to the composite sample. Initial decomposition of this sample was evidenced after one hour and forty-one minutes at room temperature.

EXAMPLE III

The specifications for benzyl chloride which is used in commercial operations usually require that the material distill within the temperature range of 177.5° C. to 185.0° C. Uncontaminated benzyl chloride will very readily distill with a good 96% recovery and the test distillation may be effected with a "dry point" within these temperature specifications. However, the distillation of a sample which has been contaminated with iron results in a dark brownish viscous nondistillable residue which will not distill up to a temperature above 200° C. and the heating of which is accompanied by much smoke and the evident thermal decomposition.

With these facts in mind, a series of tests were made to determine the effect of the stabilizer on prolonged storage on the distillation characteristics of benzyl chloride stabilized in accordance with the novel method of this invention. These storage samples were prepared as shown in Table B.

*Table B*

| Sample No. | Storage Container | Stabilizer |
|---|---|---|
| 1 | 5 pt. glass bottle | None. |
| 2 | do | 0.5% N,N' dibutylthiourea. |
| 3 | 5 gallon steel can | Do. |
| 4 | do | None. |

The benzyl chloride used for each of these four tests was procured from the same stock supply of anhydrous benzyl chloride obtained from a commercial process. A composite sample of the stock supply before the test distilled with a first drop of 178.5° C. and a "dry point" of 182.0° C. The samples were stored for 30 days at a temperature of 20° to 35° C.

After storage for the specified period of time, samples were removed from each of the four containers and washed with hydrochloric acid to remove any remaining traces of iron from the benzyl chloride. In view of the fact that the benzyl chloride decomposition products are not soluble in hydrochloric acid, this wash would not remove any decomposition material which might have been present in the stabilized samples. The hydrochloric acid washed samples were then neutralized, dried over calcium chloride and distilled.

After storage, Sample No. 1 distilled with a first drop of 175.5° C. but polymerized when 94% of the material had distilled with the boiling point of the material raising to about 200° C. thus indicating decomposition. Sample No. 4 could not be distilled for after only 17 days' storage severe and violent decomposition had taken place. Sample Nos. 2 and 3, however, which had been stabilized with 0.5% of N,N' dibutyl thiourea, readily distilled and showed no decomposition. Sample No. 2 had a first drop of 178.6° C. and a "dry point" of 181.2° C. while Sample No. 3 had a first drop of 177.9° C. and a "dry point" of 183.0° C. with both results being consistent within the range of experimental error and indicating the outstanding stability of the benzyl chloride stabilized with 0.5% of N,N' dibutyl thiourea.

Having herein described the specific embodiments of the novel compositions of this invention and having clearly set forth analytical data indicating the outstanding stability of these novel compositions,

What is claimed is:

1. A composition of matter comprising benzyl chloride and 0.05% to 2% by weight of an N,N' dialkyl thiourea wherein the alkyl substituent contains at least one and not more than eight carbon atoms.

2. A composition of matter comprising benzyl chloride and 0.1% to 1% by weight of an N,N' dialkyl thiourea wherein the alkyl substituent contains at least one and not more than eight carbon atoms.

3. A composition of matter comprising benzyl chloride and 0.1% to 1% by weight of N,N' diethyl thiourea.

4. A composition of matter comprising benzyl chloride and 0.1% to 1% by weight of N,N' diisopropyl thiourea.

5. A composition of matter comprising benzyl chloride and 0.1% to 1% by weight of N,N' dibutyl thiourea.

6. A process of stabilizing benzyl chloride against decomposition in the presence of a compound selected from the group consisting of iron, iron oxides and iron salts which comprises incorporating into the benzyl chloride from 0.05% to 2% by weight of a N,N'-dialkyl thiourea wherein the alkyl substituent contains at least one and not more than eight carbon atoms.

JAMES L. WEST, JR.

REFERENCES CITED

The following references are of record in the file of this patent:

UNITED STATES PATENTS

| Number | Name | Date |
| --- | --- | --- |
| 2,043,257 | Missbach | June 9, 1936 |
| 2,136,334 | Coleman et al. | Nov. 8, 1938 |